United States Patent [19]

Hoffman, Jr. et al.

[11] Patent Number: 4,958,654

[45] Date of Patent: Sep. 25, 1990

[54] CHECK VALVE WITH EPHEMERAL SEAL

[75] Inventors: Charles T. Hoffman, Jr., Springboro, Ohio; John W. Altenburger, Dearborn, Mich.; John A. Ramos, Utica, Mich.

[73] Assignee: General Motors Corporation, Detroit, Mich.

[21] Appl. No.: 375,326

[22] Filed: Jul. 3, 1989

[51] Int. Cl.⁵ .............................................. F16K 17/40
[52] U.S. Cl. ...................................... 137/72; 137/846; 137/493.8; 188/71.1
[58] Field of Search ...................... 137/72, 512.4, 846, 137/493.8; 188/71.1, 71.9

[56] References Cited

U.S. PATENT DOCUMENTS

| | | | |
|---|---|---|---|
| 1,058,993 | 4/1913 | Marvin | 137/72 X |
| 1,808,684 | 6/1931 | Rowley | 137/72 |
| 1,983,514 | 12/1934 | Lovekin | 137/72 |
| 3,618,627 | 11/1971 | Wagner | 137/72 X |
| 4,181,145 | 1/1980 | Mitchell | 188/71.1 X |
| 4,365,643 | 12/1982 | Masclet et al. | 137/72 X |

*Primary Examiner*—John Rivell
*Attorney, Agent, or Firm*—Ernest E. Helms

[57] ABSTRACT

A normally closed check valve has an ephemeral seal on the entry side thereof which blocks fluid flow through the check valve at pressure differentials acting across the check valve which would normally open the check valve and cause fluid flow to occur through the check valve. The ephemeral seal is a high viscosity material which when heated to a temperature well above the normally encountered ambient temperature will become of sufficiently low viscosity to flow from the check valve entry and be removed from blocking the opening of the check valve. The ephemeral seal is usually so heated by operation of the mechanism in which the check valve and ephemeral seal are installed, such operation normally creating sufficient heat to heat the ephemeral seal to that temperature which causes it to be of sufficiently low viscosity to flow away from the check valve entry. The mechanism disclosed which uses the check valve and a preferred embodiment of the ephemeral seal is a disc brake caliper assembly.

2 Claims, 1 Drawing Sheet

CHECK VALVE WITH EPHEMERAL SEAL

FIELD OF THE INVENTION

The invention is in the field of check valves, and particularly those which operate in an environment of fluids such as brake fluid by way of example. Such fluids are often placed in the operating environment by a vacuum bleed and fill operation, and are later subjected to various temperatures and pressures during normal operation of the mechanism utilizing the fluid. At times it is desirable to temporarily inhibit a check valve from opening, and then without further outside physical manipulation of the valve removing the inhibition at a desired stage, all without deleterious effects on the fluid or the mechanism, including the check valve.

DESCRIPTION OF RELATED ART

U.S. Pat. No. 4,181,145, entitled, "Two-Way Check Valve" and issued Jan. 1, 1980, discloses and claims a check valve in a self-adjusting disc brake caliper assembly provided with a parking brake to mechanically actuate the disc brake, as well as having hydraulic service brake actuation. A brake of this type is disclosed in detail in U.S. Pat. No. 3,770,082, issued Nov. 6, 1973. There is a confined air space between the outer piston and the inner piston of the caliper assembly As the brake is operated, the confined air space will be subjected to changes in temperature in a cyclical manner as the brake creates heat by friction braking and then is cooled when the brake is inactive, with consequent changes in air pressure in the confined air space. The two-way check valve provides a vent for this space so that such changes in pressure do not have any effect on the operation of the caliper assembly. The valve operates to maintain the confined air space between the outer piston and the inner piston substantially at ambient air pressure while preventing contamination of the brake actuating mechanism by air borne contaminants normally encountered in the area of a vehicle rear brake mechanism.

SUMMARY OF THE INVENTION

The invention relates to the addition of an ephemeral substance to the valve of the above noted U.S. Pat. No. 4,181,145 which will restrict the valve operation during the vacuum bleeding operation. This operation evacuates ambient air from the brake system in which the valve is installed, and fills the system with brake fluid. Following the bleed and fill procedure, under normal brake operating temperature increases and decreases and time, the substance will become less viscous, flow away from the valve and be dissipated, returning the valve to its normal operation. During brake actuations, the pressure increases in the confined air space caused by the heating of the air therein may aid in removing the ephemeral substance from the valve. The invention has method characteristics as well as being subject to structural definition. It can be used on other valve mechanisms requiring temporary prohibition of valve opening operation followed by restoration of normal valve operation when the mechanism in which it is used is operated in its normal fashion.

DESCRIPTION OF THE PREFERRED EMBODIMENT

Figure 1:
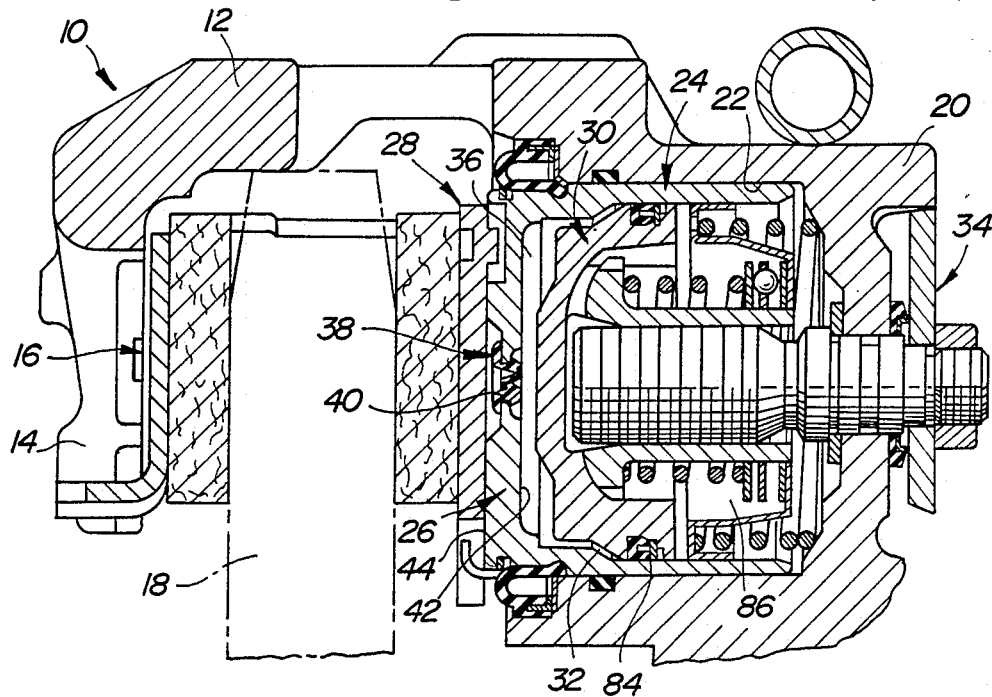
FIG. 1 is a cross section view of a disc brake caliper assembly having a check valve assembly with an ephemeral seal embodying the invention.

The disc brake 10 of FIG. 1 is similar to that disclosed in the patents referred to above. It has a caliper housing 12 with one caliper leg 14 having a brake shoe assembly 16 mounted thereon for braking engagement with one side of the disc or rotor 18. The other caliper leg 20 has a cylinder 22 formed therein. An outer piston 24 is reciprocably and sealingly mounted in cylinder 22. A piston face wall 26 receives another brake shoe assembly 28 which is arranged for braking engagement with the other side of disc or rotor 18. An inner piston 30 is reciprocably and sealingly mounted within outer piston 24. Clutch surfaces on mounting portions of pistons 24 and 30 define a clutch 32. A brake adjusting and parking brake actuating mechanism 34, which may be of the type that is the subject of the above noted U.S. Pat. No. 3,770,082, is contained within cylinder 22. A part of mechanism 34 extends outwardly of the cylinder so as to be mechanically actuated. A confined air space 36 is formed between pistons 24 and 30. The confined air space 36 is subject to cyclical heating and cooling during cyclical brake actuation and release which results in changes in air pressure in the space. The two-way check valve assembly 38, which is disclosed and claimed in the above noted U.S. Pat. No. 4,181,145, allows the confined air space 36 to be vented to ambient air upon a pressure increase relative to ambient air pressure, or to receive air from ambient air when the pressure in the confined air space decreases below ambient air pressure. The valve assembly 38 is mounted in an opening 40 formed in the face wall 26 of piston, the opening communicating confined air space 36 with ambient air under control of the valve assembly.

Figure 2:
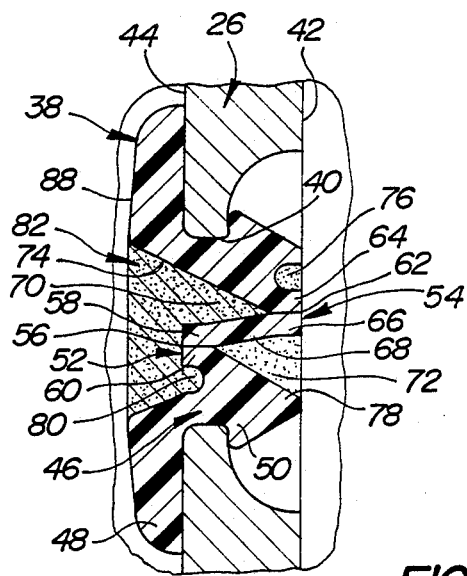
FIG. 2 is a cross section view of the check valve assembly and ephemeral seal of FIG. 1.

The valve assembly, including the ephemeral seal of the invention, is illustrated in greater detail in FIG. 2. The piston face wall 26 has an inner wall 42 forming a wall of the confined air space 36, and an outer wall 44 connected with ambient air. The check valve assembly 38 has a body section 46 which extends through opening 40. The body section has axially spaced mounting and sealing flanges formed thereon. The outer mounting and sealing flange 48 fits in a sealing manner against outer wall 44 of the piston wall 26. The inner mounting and sealing flange 50 sealingly fits against a recessed portion of the inner wall 42 of piston wall 26. The valve assembly 38 is therefore tightly retained in position in opening 40 and so sealed that no air or foreign contaminant material will pass between the check valve assembly and the surface defining the opening 40 of piston wall 26, either to or from the confined air space 36.

The body section 46 of valve assembly 38 has a first check valve 52 and a second check valve 54. These check valves are normally closed duckbill check valves. Check valve 52 has a slit or normally closed valve opening 56 defined by flexible, resilient valve sides 58 and 60. Check valve 54 has a valve slit or normally closed valve opening 62 defined by flexible, resilient valve sides 64 and 66. A common wall 68 is provided between valve entry chamber 70 of valve 54 and valve entry chamber 72 of valve 52. Common wall 68 has its axially opposite sides forming valve sides 58 and 66. The side wall 74 of entry chamber 70 terminates in its inner end at valve side 64. An axially extending recess 76 in the inner end of the valve assembly 38 provides for flexibility of the valve side 64. Side wall 78 of entry chamber 72 extends from the inner side of valve assembly 38 outwardly and terminates to form valve side 60 of check valve 52. An axially extending recess 80 formed in side wall 78 provides for the flexibility of the valve side 60.

Check valve 52 is normally closed but will open when air pressure in confined air space 36 reaches a predetermined level, creating sufficient pressure differential across the valve assembly to cause flexure of valve sides 58 and 60 and opening of the valve slit 56. When the pressure is thus released, the flexible nature of the valve sides re-close the check valve. Similarly, when the air pressure in confined air space 36 decreases below ambient air pressure to a predetermined pressure level, the pressure differential causes the sides 64 and 66 of valve 54 to be moved apart and open valve slit 62, allowing ambient air pressure to be introduced into space 36. The flexible nature of the valve sides then causes the valve to close upon relief of the pressure differential.

To this point of the description, the construction and operation of the valve of above noted U.S. Pat. No. 4,181,145 has been described. This construction and operation is the same in the herein disclosed embodiment, after the ephemeral seal has been dissipated as will be described.

It is standard practice in the brake industry to vacuum bleed and fill the brake system. This is done by imposing a high vacuum in the brake system before it has any substantial amount of brake fluid in it, removing the ambient air. The brake fluid with which the system is being charged is introduced into the evacuated system, and fills the system. This operation is normally performed on the brake systems of new vehicles before they come off of the production line. Before the operation is begun, the confined air space 36 is at atmospheric ambient air pressure and temperature. When vacuum bleeding begins, the confined air space 36 is also subjected to the high vacuum pressure because the lip seal 84 of piston 30 also performs as a check valve which permits air flow from confined air space 36 into the brake pressurizing chamber 86. Ambient air is then pulled through the valve 54 into the brake system. This is prevented only to the extent that some pressure differential is required to cause seal 84 to open in its check valve function, and some pressure differential is required to cause valve 54 to open. Even the higher one of these pressure differentials is lower than desired for most effective vacuum bleeding. It is therefore desirable to prevent ambient air from flowing through valve 54, and then past seal 84, resulting in preventing such air from being pulled into the brake system during vacuum bleeding. However, it is also desirable to permit ambient air to enter and leave the confined air space 36 once the brake system has been charged with brake fluid and is being operated as a brake, so that valve assembly 38 then operates in its intended manner as above described.

The invention involves the provision of the ephemeral seal 82 in the valve entry chamber 70 of valve 54. For ease of placing the seal material of seal 82 in chamber 70, the material may be placed in the space on the outer side of valve 52 as well, including recess 80, so that it is substantially flush with the outer surface 88 of flange 48. This may be done before or after the valve assembly 38 is installed in the piston opening 40, but preferably afterward.

The ephemeral seal 82 should be made of a substance which will dissolve or otherwise be absorbed into the brake fluid or other operating fluid of the system in which valve 38 operates should any of the seal substance be pulled into the fluid system before the seal material dissipates under heat and time. Also, due to the handling of the brake components, some of the seal material may inadvertently be deposited on a part of the brake caliper, such as the outer piston 30, during or after the seal material has been put in place. Therefore it should be compatible with the hydraulic brake fluid in a brake system when the seal is employed in such a system, as herein shown and described. Brake fluids currently in common use are either glycol or silicone based, and the ephemeral seal used should be compatible with the appropriate one, or both of, such fluids.

Under normal brake system operating conditions, however, the substance forming the ephemeral seal is subject to heat each time the brake system is operated, as is the air in confined air space 36, so that the substance will become less viscous and will flow out of the valve entry chamber and dissipate in the space between the piston face wall 26 and the brake shoe assembly 28, and eventually to the atmosphere. It will not be infused or otherwise introduced into the hydraulic brake fluid system.

The pressure increase in confined air space 36 caused by the heating of the air therein may also aid in the removal of the ephemeral seal substance from the area of valve 52, and therefore aid in the removal of the substance from the entry chamber 70 of valve 54 as well. This will possibly occur when the pressure opens valve 52 and pushes against the ephemeral seal material that may be blocking that valve opening 56. With the ephemeral seal material being hotter than ambient temperature, it has a greater tendency to flow, and this pressure can at times move the material somewhat before the material flows out of the entry chamber of its own accord.

Materials which have been found to be satisfactory as ephemeral seals in various applications include high viscosity fluids, certain greases and lubricants, spermaceti, carnauba wax, and various gels. Any material or combination of materials selected must maintain its high viscosity so as to remain in position in the check valve up to and including ambient temperatures of about 120°F., since such temperatures are commonly encountered in shipping, storage, and factory installation. If higher temperatures are likely to be so encountered, the material must have a sufficiently high viscosity to so remain in position at temperatures beyond such higher temperatures. Since the removal of the ephemeral seal is triggered by the creation of still higher temperatures, the material of which the ephemeral seal is made must in effect melt or at least flow at a normally generated predetermined higher temperature than ambient temperatures normally encountered. In brake assemblies such as that herein disclosed, such predetermined higher temperature may be on the order of 180°F., for example. It could be even higher, since the temperature between the brake shoe assembly 28 and the face wall 26 of piston 24 in the area of valve 38 can often reach 300°F. or more. However, it is considered sufficient to have the predetermined higher temperature at which the ephemeral seal will flow or melt to be about 50°F.

greater than the maximum expected ambient temperature to which the material will be exposed after being placed on the valve 38 but before the brake is actuated.

Two examples of such material are here listed and identified in detail. One is a silicone fluid having a dimethyl polysiloxane base suitable for lubricating mechanical elements and rubber components. Its viscosity at 25°C., using Brookfield spindle no. 4 at 2.5 RPM, is 57,000 to 63,000 CSTKS Its flash point, per ASTM D92, is 500°F. minimum. Its specific gravity, per ASTM D1298, at 25°C. is 0.968–0.982. Its pour point, per ASTM D97, is below −30°F. It passes the modified SAE J-1703 corrosion test, using no L- water. Using the SAE J-1703, paragraph 4.12B rubber swell test, the base diameter change is within the range of −0.10 to +0.010. In testing its volatile loss, its weight loss is less than 2.0% when 2.0 grams are heated in an open aluminum dish for three hours at 200°C. in a gravity oven.

The other example is a polyalkylene glycol lubricant. It is a grade of an inhibited synthetic material suitable for use as a lubricant in the assembly of hydraulic brake parts. Its viscosity at 100°F. (SUS) is in the range of 1100 to 1275. Its specific gravity at 20/20°C. is 0.996 to 1.001. Its acidity percent by weight calculated as dimer acid is 0.9 to 1.1. It has 0.4 to 0.6 percent of diphenylolpropane by weight. Its flash point, using an open cup tester is 430°F. minimum, and its fire point using that tester is 510°F. minimum. It has a maximum ash of 0.01 percent by weight, and a maximum water content of 0.25 percent by weight.

The invention effectively prevents the entry of ambient air into the brake fluid system when vacuum bleeding that system. The ephemeral seal material is preferably applied to the check valve after the check valve is installed in the outer piston face wall and after the parking brake actuator parts are assembled inside the outer piston, but prior to the assembly of the outer piston and the actuator assembly into the caliper housing.

By installing the ephemeral seal no later than during assembly of the caliper assembly or other assembly in which it is used, the seal also prevents contamination of the interior side of the seal 38 and the space 36 during handling, storage and shipping before the caliper assembly is installed on a vehicle. After the system has been subjected to vacuum bleeding and fluid charging, the ephemeral seal remains in place until the brake system, or other system in which the seal is used and which generates heat during actuation, is operated. When the temperature of the ephemeral seal reaches a predetermined value as described earlier, its viscosity is sufficiently reduced so as to allow it to flow or melt out of the entry chamber 70 of valve 54 and also away from the exit area of valve 52, eventually dissipating into the atmosphere. It normally never comes into contact with the hydraulic fluid of the system so that there is no problem of contamination of that fluid by the ephemeral seal substance. If that is considered to be a concern, however, the ephemeral seal material can be a substance that will dissolve in the hydraulic fluid without any deleterious result. Both of the samples described above in detail meet this requirement.

The embodiments of the invention in which an exclusive property or privilege is claimed are defined as follows:

1. A method of inhibiting the opening of a normally closed check valve and removing that inhibition upon the attainment of a predetermined check valve operating condition, said method comprising the steps of:
   (1) assembling mechanism including a normally closed check valve in operative relation and applying a high viscosity ephemeral seal material to an entry chamber of the check valve during such assembly so as to inhibit the opening of the check valve to permit fluid flow therethrough when a differential fluid pressure is applied to one side of the check valve normally tending to so open the check valve;
   (2) applying a subatmospheric air pressure to the exit side of the check valve to establish an air pressure differential across the check valve and the ephemeral seal material in excess of the air pressure differential required to open the check valve when no ephemeral seal material is present, bleeding air from that side and from other portions of the assembled mechanism while blocking the opening of the normally closed check valve with the ephemeral seal material;
   (3) charging a portion of the assembled mechanism with a hydraulic fluid while keeping the hydraulic fluid physically separated from the check valve and the ephemeral seal material;
   (4) and afterward operating the assembled mechanism in a manner to create the predetermined check valve operating condition in which sufficient heat is applied to the ephemeral seal material in the check valve entry chamber to cause the ephemeral seal material to reach a temperature above which the ephemeral seal material becomes sufficiently viscous to flow out of and away from the check valve entry chamber and so removing the ephemeral seal material from the check valve entry chamber, thus removing the inhibition to the opening of the check valve at an air pressure differential acting thereacross which is substantially less than the air pressure differential established across the check valve and the ephemeral seal material in step (2).

2. The method of claim 1 in which the temperature above which the ephemeral seal material becomes of sufficiently low viscosity to flow is greater than the normal temperature range to which the ephemeral seal material is exposed.

* * * * *